US010737797B2

(12) United States Patent
Murrow et al.

(10) Patent No.: US 10,737,797 B2
(45) Date of Patent: Aug. 11, 2020

(54) VERTICAL TAKEOFF AND LANDING AIRCRAFT

(71) Applicant: General Electric Company, Schenectady, NY (US)

(72) Inventors: Kurt David Murrow, Liberty Township, OH (US); Darek Tomasz Zatorski, Fort Wright, KY (US); Andrew Breeze-Stringfellow, Montgomery, OH (US); Dominic Barone, Centerville, OH (US)

(73) Assignee: General Electric Company, Schenectady, NY (US)

( * ) Notice: Subject to any disclaimer, the term of this patent is extended or adjusted under 35 U.S.C. 154(b) by 284 days.

(21) Appl. No.: 15/699,315

(22) Filed: Sep. 8, 2017

(65) Prior Publication Data

US 2019/0023389 A1 Jan. 24, 2019

Related U.S. Application Data

(60) Provisional application No. 62/535,444, filed on Jul. 21, 2017.

(51) Int. Cl.
*B64D 27/24* (2006.01)
*B64C 29/00* (2006.01)
(Continued)

(52) U.S. Cl.
CPC .............. *B64D 27/24* (2013.01); *B64C 3/32* (2013.01); *B64C 3/38* (2013.01); *B64C 29/0025* (2013.01);
(Continued)

(58) Field of Classification Search
CPC ... B64C 9/38; B64C 29/0016; B64C 29/0025; B64C 2201/088; B64C 27/26
See application file for complete search history.

(56) References Cited

U.S. PATENT DOCUMENTS 2,973,166 A * 2/1961 Stahmer .............. B64C 29/0025
 244/23 R
3,083,935 A * 4/1963 Piasecki .............. B64C 29/0025
 244/12.3
(Continued)

FOREIGN PATENT DOCUMENTS

DE 20 2016 005 012 U1 10/2016
WO 2006/069291 A2 6/2006
(Continued)

OTHER PUBLICATIONS

Wikipedia, NASA GL-10 Greased Lightning, https://en.wikipedia.org/wiki/NASA_GL-10_Greased_Lighting.
(Continued)

*Primary Examiner* — Joseph W Sanderson
(74) *Attorney, Agent, or Firm* — Dority & Manning, P.A.

(57) ABSTRACT

An aircraft includes a fuselage; a wing coupled to, and extending from, the fuselage; and a propulsion system. The propulsion system includes a plurality of electric fans integrated into the wing and oriented to generate thrust along a vertical direction, the plurality of electric fans arranged along a length of the wing and including an outer-most electric fan along a transverse direction relative to the fuselage. The outer-most electric fan is at least one of a variable pitch fan or a variable speed fan to provide increased stability to the aircraft.

18 Claims, 7 Drawing Sheets

US 10,737,797 B2

Page 2

(51) Int. Cl.
*B64C 3/32* (2006.01)
*B64D 27/08* (2006.01)
*B64D 29/04* (2006.01)
*B64D 35/02* (2006.01)
B64C 3/38 (2006.01)
*B64D 33/04* (2006.01)
*B64D 31/06* (2006.01)
B64D 27/02 (2006.01)
B64D 27/26 (2006.01)
H02K 7/18 (2006.01)

(52) U.S. Cl.
CPC ............. *B64D 27/08* (2013.01); *B64D 29/04* (2013.01); *B64D 31/06* (2013.01); *B64D 33/04* (2013.01); *B64D 35/02* (2013.01); B64D 27/02 (2013.01); B64D 27/26 (2013.01); B64D 2027/026 (2013.01); F05D 2220/76 (2013.01); F05D 2270/093 (2013.01); H02K 7/1823 (2013.01)

(56) References Cited

U.S. PATENT DOCUMENTS

| | | | | |
|---|---|---|---|---|
| 3,171,613 | A * | 3/1965 | James | B64C 29/0016 244/12.3 |
| 3,618,875 | A * | 11/1971 | Kappus | B64C 29/0025 244/12.3 |
| 3,730,456 | A * | 5/1973 | Morgan | B64C 29/005 244/12.3 |
| 5,244,167 | A * | 9/1993 | Turk | B64C 9/38 244/12.1 |
| 7,188,802 | B2 | 3/2007 | Magre | |
| 7,857,254 | B2 * | 12/2010 | Parks | B64C 15/00 244/12.4 |
| 8,544,787 | B2 | 10/2013 | Lee et al. | |
| 8,640,985 | B2 | 2/2014 | Brunken, Jr. | |
| 8,655,510 | B2 | 2/2014 | Eglin | |
| 8,733,690 | B2 | 5/2014 | Bevirt et al. | |
| 8,777,150 | B2 | 7/2014 | Wang | |
| 8,870,114 | B2 | 10/2014 | Botti et al. | |
| 8,907,595 | B2 | 12/2014 | Weibel et al. | |
| 8,915,464 | B2 | 12/2014 | Ferrier et al. | |
| 8,931,732 | B2 | 1/2015 | Sirohi et al. | |
| 9,008,942 | B2 | 4/2015 | Dyrla et al. | |
| 9,126,678 | B2 | 9/2015 | Ross et al. | |
| 9,162,771 | B2 | 10/2015 | Roggemans et al. | |
| 9,174,728 | B2 | 11/2015 | Altmikus et al. | |
| 9,187,174 | B2 | 11/2015 | Shaw | |
| 9,199,732 | B2 | 12/2015 | Isaac et al. | |
| 9,242,729 | B1 | 1/2016 | Wang et al. | |
| 9,248,908 | B1 | 2/2016 | Luyks | |
| 9,284,059 | B2 | 3/2016 | Prud Homme-Lacroix | |
| 9,346,542 | B2 * | 5/2016 | Leng | B64C 29/0025 |
| 9,714,090 | B2 * | 7/2017 | Frolov | G08G 5/0021 |
| 10,293,914 | B2 * | 5/2019 | Wiegand | B64C 1/0009 |
| 2006/0192046 | A1 * | 8/2006 | Heath | B64C 15/14 244/12.3 |
| 2008/0230656 | A1 * | 9/2008 | Kretchmer | B64C 3/38 244/7 R |
| 2013/0140404 | A1 * | 6/2013 | Parks | G05D 1/102 244/23 A |
| 2013/0251525 | A1 * | 9/2013 | Saiz | B64C 27/26 416/23 |
| 2014/0097290 | A1 * | 4/2014 | Leng | B64C 29/0025 244/6 |
| 2014/0158816 | A1 | 6/2014 | DeLorean | |
| 2015/0266571 | A1 | 9/2015 | Bevirt et al. | |
| 2015/0284075 | A1 | 10/2015 | Alber | |
| 2015/0380999 | A1 | 12/2015 | Joshi et al. | |
| 2016/0311522 | A1 | 10/2016 | Wiegand | |
| 2016/0368600 | A1 * | 12/2016 | Frolov | G08G 5/0021 |
| 2017/0029131 | A1 * | 2/2017 | Steinwandel | B64D 35/08 |
| 2017/0158322 | A1 * | 6/2017 | Ragland | B64C 29/0025 |
| 2017/0203839 | A1 | 7/2017 | Giannini et al. | |
| 2018/0105267 | A1 * | 4/2018 | Tighe | B64C 27/26 |
| 2018/0141652 | A1 * | 5/2018 | Deslypper | B64C 3/54 |
| 2018/0162525 | A1 * | 6/2018 | St. Clair | B64C 29/0025 |
| 2018/0290736 | A1 * | 10/2018 | Mikic | B64C 27/26 |
| 2019/0023390 | A1 * | 1/2019 | Murrow | B64D 31/06 |
| 2019/0023391 | A1 * | 1/2019 | Murrow | B64D 31/06 |
| 2019/0023408 | A1 * | 1/2019 | Murrow | B64D 31/06 |
| 2019/0047680 | A1 * | 2/2019 | Murrow | B64D 31/06 |
| 2019/0047681 | A1 * | 2/2019 | Murrow | B64D 31/06 |
| 2019/0047716 | A1 * | 2/2019 | Murrow | B64D 31/06 |
| 2019/0047717 | A1 * | 2/2019 | Murrow | B64D 31/06 |
| 2019/0047718 | A1 * | 2/2019 | Murrow | B64D 31/06 |
| 2019/0047719 | A1 * | 2/2019 | Murrow | B64D 31/06 |
| 2019/0061964 | A1 * | 2/2019 | Murrow | B64D 31/06 |
| 2019/0112039 | A1 * | 4/2019 | Pfaller | B64C 3/14 |

FOREIGN PATENT DOCUMENTS

| | | |
|---|---|---|
| WO | 2015/028627 A1 | 3/2015 |
| WO | 2015/056124 A1 | 4/2015 |
| WO | 2016/181044 A1 | 11/2016 |

OTHER PUBLICATIONS

Extended European Search Report and Opinion issued in connection with corresponding EP Application No. 18189106.0 dated Jan. 21, 2019.

* cited by examiner

VERTICAL TAKEOFF AND LANDING AIRCRAFT

RELATED APPLICATION

The present application is based upon and claims priority to U.S. Provisional Patent Application Ser. No. 62/535,444, filed on Jul. 21, 2017.

FIELD

The present subject matter relates generally to a propulsion system for an aircraft having vertical takeoff and landing capabilities.

BACKGROUND

Aircraft have been developed with a capability for performing vertical takeoff and landings. Such a capability may allow for the aircraft to reach relatively rugged terrains and remote locations, where it may be impractical or infeasible to construct a runway large enough to allow for a traditional aircraft (lacking vertical takeoff capability) to takeoff or land.

Typically these aircraft capable of performing vertical takeoff and landings have engines and propulsors that are vectored to generate both vertical thrust and forward thrust. However, the design characteristics that make a propulsor efficient for vertical takeoff and landing may not result in efficient forward flight. Accordingly, existing aircraft capable of performing vertical takeoff and landing include propulsors that may be well suited for generating vertical thrust, but that may not be very well suited for efficient forward flight. This discrepancy between vertical takeoff and landing and cruise efficiency is exaggerated as cruise speed increases. An aircraft capable of more efficiently performing a vertical takeoff and landing combined with high speed cruise would therefore be useful.

BRIEF DESCRIPTION

Aspects and advantages of the invention will be set forth in part in the following description, or may be obvious from the description, or may be learned through practice of the invention.

In one embodiment of the present disclosure an aircraft is provided defining a vertical direction and a transverse direction. The aircraft includes a fuselage; a wing coupled to, and extending from, the fuselage; and a propulsion system. The propulsion system includes a plurality of electric fans integrated into the wing and oriented to generate thrust along the vertical direction, the plurality of electric fans arranged along a length of the wing and including an outer-most electric fan along the transverse direction relative to the fuselage, the outer-most electric fan being at least one of a variable pitch fan or a variable speed fan to provide increased stability to the aircraft.

In certain exemplary embodiments the plurality of electric fans further include at least one interior electric fan positioned closer to the fuselage along the transverse direction than the outermost electric fan, wherein the at least one interior electric fan is configured differently than the outermost electric fan.

For example, in certain exemplary embodiments the outermost electric fan is a variable pitch fan, and wherein the at least one interior electric fan is a fixed-pitch fan.

In certain exemplary embodiments the plurality of electric fans further include at least one interior electric fan positioned closer to the fuselage along the transverse direction than the outermost electric fan, wherein the at least one interior electric fan is configured in the same manner as the outermost electric fan.

In certain exemplary embodiments the wing is a first wing, wherein the plurality of electric fans of the hybrid electric propulsion system is a first plurality of electric fans. In such an exemplary embodiment, the aircraft may further include a second wing, a third wing, and a fourth wing, wherein the hybrid electric propulsion system further includes a second plurality of electric fans integrated into the second wing and arranged along a length of the second wing, a third plurality of electric fans integrated into the third wing and arranged along a length of the third wing, and a fourth plurality of electric fans integrated into the fourth wing and arranged along a length of the fourth wing, wherein each of the second plurality of electric fans, the third plurality of electric fans, and fourth plurality of electric fans are oriented to generate thrust along the vertical direction.

For example, in certain exemplary embodiments the second plurality of electric fans includes an outermost electric fan along the transverse direction relative to the fuselage being at least one of a variable pitch fan or a variable speed fan, wherein the third plurality of electric fans includes an outermost electric fan along the transverse direction relative to the fuselage being at least one of a variable pitch fan or a variable speed fan, and wherein the fourth plurality of electric fans includes an outermost electric fan along the transverse direction relative to the fuselage being at least one of a variable pitch fan or a variable speed fan.

In certain exemplary embodiments the wing is a fixed wing including a variable geometry portion movable between a vertical thrust position in which the plurality of electric fans are exposed and a forward thrust position in which the plurality of electric fans are each substantially completely covered.

For example, in certain exemplary embodiments the variable geometry portion of the wing forms an exhaust arrangement for the plurality of electric fans when moved to the vertical thrust position.

For example, in certain exemplary embodiments the outermost electric fan defines a fan diameter, wherein the exhaust arrangement formed by the wing defines a length along the vertical direction, and wherein the length is greater than or equal to the fan diameter.

For example, in certain exemplary embodiments each of the plurality of electric fans define substantially the same fan diameter.

In certain exemplary embodiments the hybrid electric propulsion system further includes a power source including a combustion engine and an electric machine, the electric machine powered by the combustion engine, and wherein the plurality of electric fans are driven at least in part by the electric machine.

For example, in certain exemplary embodiments the hybrid electric propulsion system further includes a forward thrust propulsor, wherein the forward thrust propulsor is selectively or permanently mechanically coupled to the combustion engine.

For example, in certain exemplary embodiments the combustion engine is a turboshaft engine.

In certain exemplary embodiments the wing defines an aspect ratio greater than about 3:1.

For example, in certain exemplary embodiments the wing is an aft wing. In such an exemplary embodiment, the aircraft may further include a forward wing, the forward wing attached to, and extending from, the fuselage at a location forward of the aft wing, wherein the forward wing defines an aspect ratio greater than or equal to about 1.5:1.

In certain exemplary embodiments the hybrid electric propulsion system further includes an electric power source and an electric power bus, wherein the electric power bus electrically connects the electric power source to each of the plurality of electric fans.

For example, in certain exemplary embodiments the electric power bus includes a plurality of electric power controllers with each of the plurality of electric power controllers associated with one of the plurality of electric fans, wherein each electric power controller is configured to modify electrical power provided from the electric power source to the respective electric fan.

For example, in certain exemplary embodiments each of the plurality of electric fans are configured as variable speed fans.

In certain exemplary embodiments each of the plurality of electric fans are fixed in orientation within the wing.

In certain exemplary embodiments the electric power source is configured to generate at least about one megawatt of electrical power during operation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
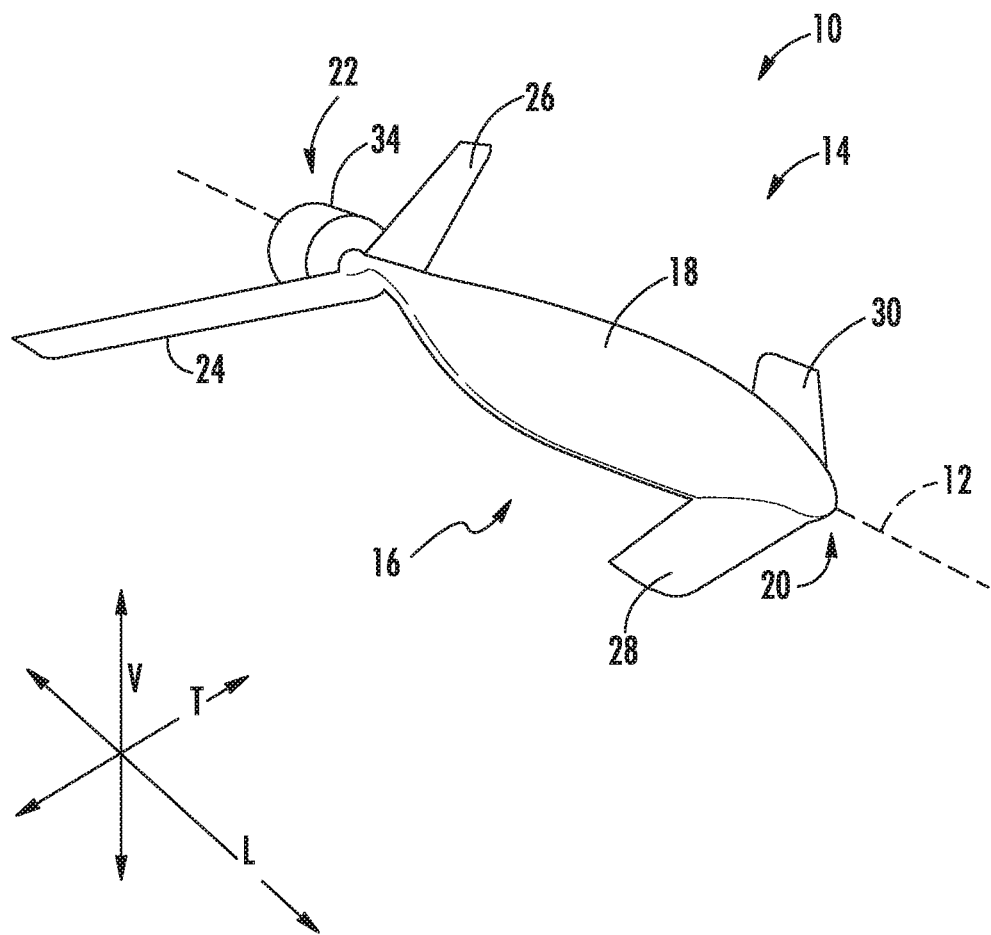
FIG. 1 is a perspective view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to an aircraft capable of performing vertical takeoff and landing maneuvers. More specifically, the present disclosure is related to such an aircraft including a fuselage, a plurality of wings coupled to and extending from the fuselage, and a propulsion system. The propulsion system includes a plurality of electric fans integrated into each of the wings. Each of such plurality of electric fans are oriented to generate thrust along a vertical direction of the aircraft and are arranged along a length of the respective wing. Along each wing, the plurality of electric fans included includes an outermost electric fan (i.e., outermost relative to the fuselage). The outermost electric fan of each of these wings is at least one of a variable pitch fan or a variable speed fan in order to provide increased ability for the aircraft.

Figure 2:
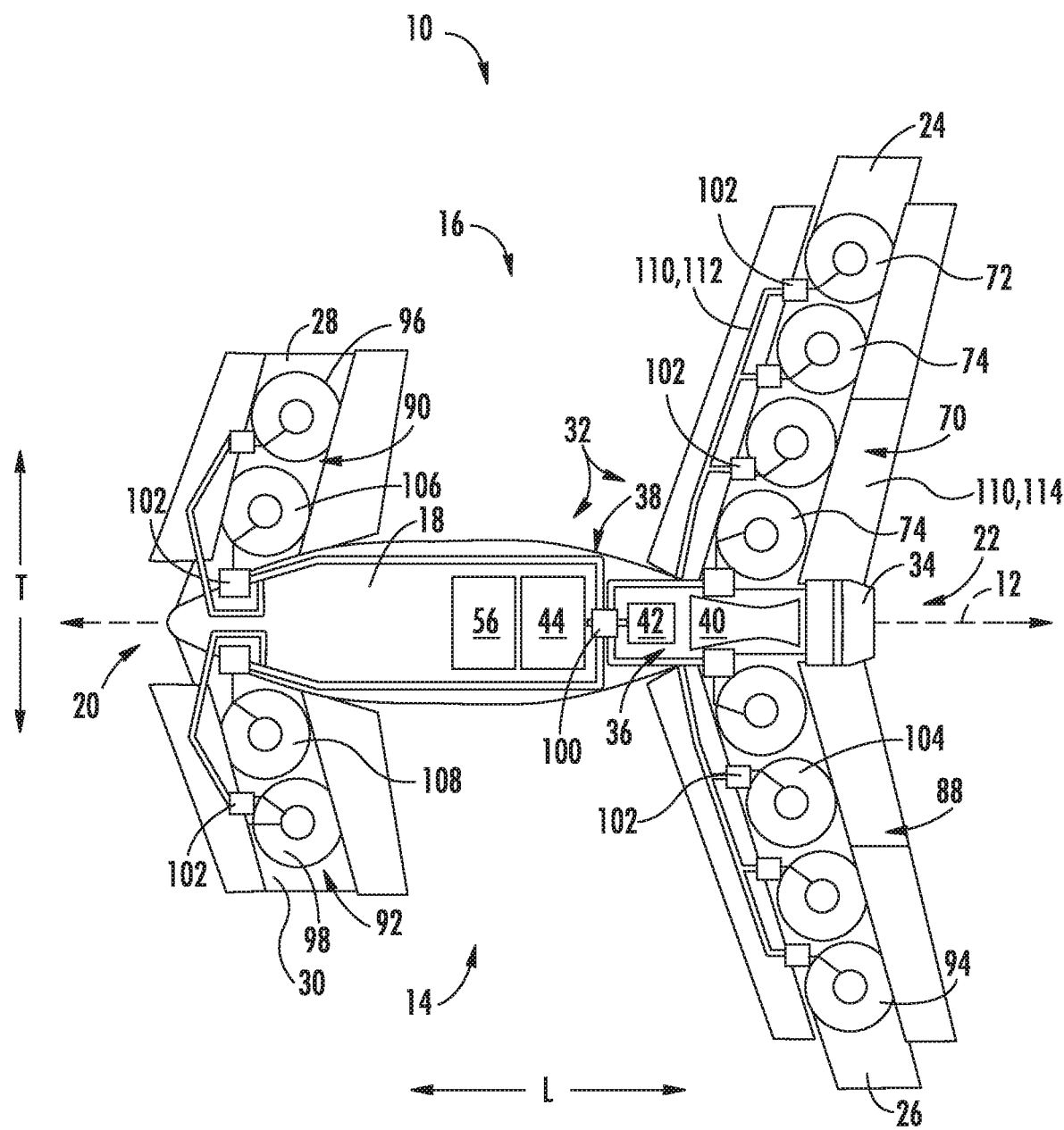
FIG. 2 is a top, schematic of the exemplary aircraft of FIG. 1 in a vertical flight position.
Figure 3:
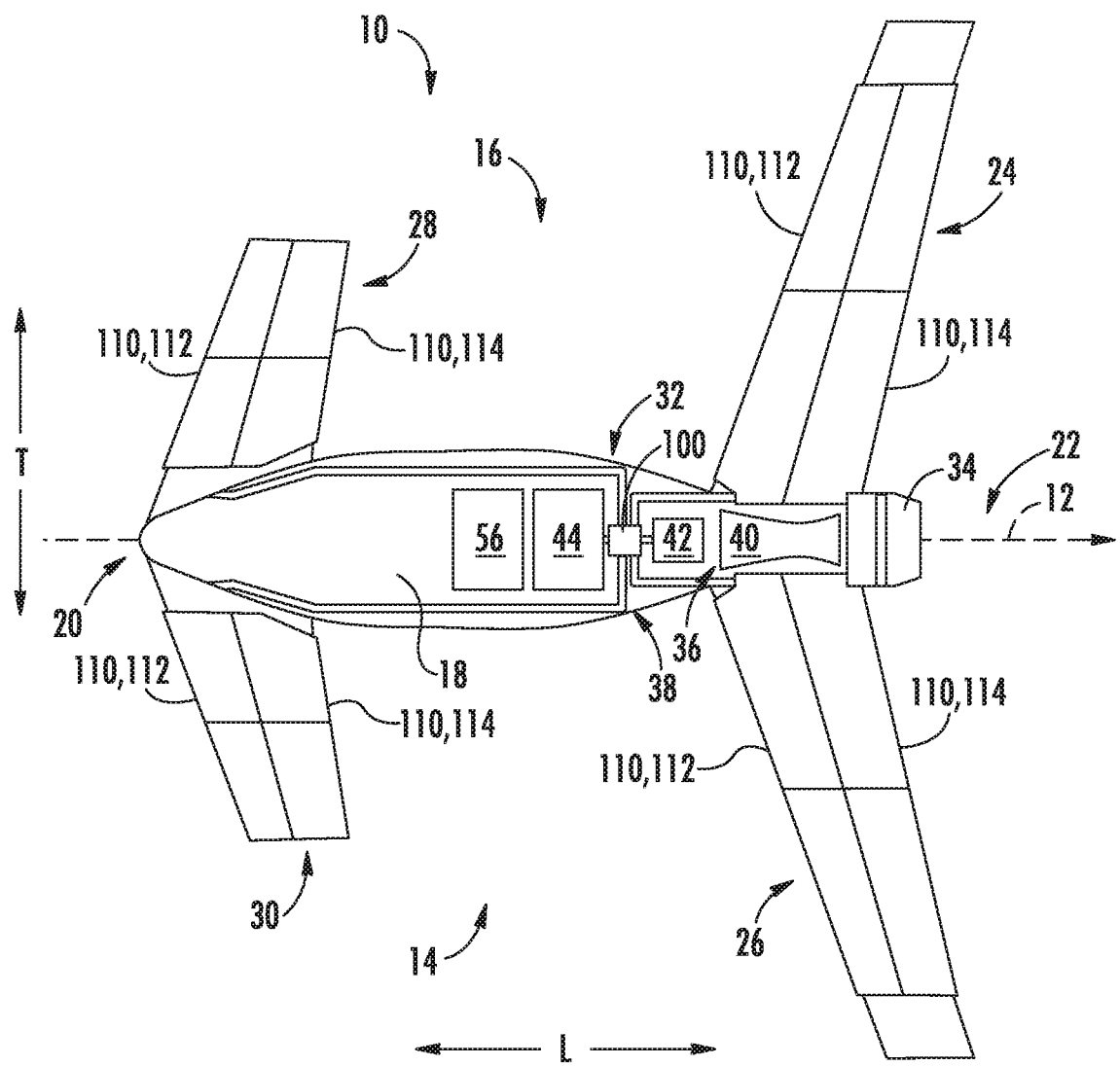
FIG. 3 is a top, schematic of the exemplary aircraft of FIG. 1 in a forward flight position.

Referring now to the drawings, wherein identical numerals indicate the same elements throughout the Figures ("Figs."), FIGS. 1 through 3 depict an aircraft 10 in accordance with various embodiments of the present disclosure. More specifically, FIG. 1 provides a perspective view of the exemplary aircraft 10; FIG. 2 provides a top, schematic view of the exemplary aircraft 10 of FIG. 1 in a vertical thrust configuration; and FIG. 3 provides a top, schematic view of the exemplary aircraft 10 of FIG. 1 in a forward thrust configuration. As shown in FIGS. 1 through 3 collectively, the aircraft 10 defines a longitudinal direction L (and a longitudinal centerline 12 that extends therethrough), a vertical direction V, and a transverse direction T. Additionally, the aircraft 10 defines a port side 14 and an opposite starboard side 16.

The aircraft 10 includes a fuselage 18 extending between a forward end 20 and an aft end 22 generally along the longitudinal centerline 12 of the aircraft 10. The aircraft 10 additionally includes a four wings, each attached to or formed integrally with the fuselage 18. Specifically, for the embodiment depicted, the aircraft 10 includes a first wing, a second wing, a third wing, and a fourth wing, or more particularly an aft starboard wing 24, an aft port wing 26, a forward starboard wing 28, and a forward port wing 30, and. Each of these wings 24, 26, 28, 30 is attached to, or formed integrally with, the fuselage 18 and extends from the fuselage 18 outwardly generally along the transverse direction T (i.e., outwardly relative to the fuselage 18). It will be appreciated that although the forward port wing 30 and forward starboard wing 28 are depicted as being separate wings, in other embodiments, the forward port wing 30 and forward starboard wing 28 may be formed integrally, and together attached to the fuselage 18. Similarly, although the aft port wing 26 and aft starboard wing 24 are depicted as being separate wings, in other embodiments, the aft port wing 26 and aft starboard wing 24 may be formed integrally, and together attached the fuselage 18.

Although not depicted, in other embodiments, the aircraft 10 may additionally include one or more stabilizers, such as one or more vertical stabilizers, horizontal stabilizers, etc. Moreover, it will be appreciated, that although not depicted, in certain embodiments, one or more of the wings may additionally include flaps, such as leading-edge flaps or trailing edge flaps, for assisting with controlling the aircraft 10 during flight.

Referring still to FIGS. 1 through 3, the exemplary aircraft 10 further includes a propulsion system 32 for providing the aircraft 10 with a desired amount of thrust during operation. Broadly speaking, the exemplary propulsion system 32 includes a plurality of vertical thrust electric fans (or "VTE fans") for generating vertical thrust during operation, a forward thrust propulsor 34, and a power source 36 for driving the plurality of VTE fans and the forward thrust propulsor 34. Additionally, for the embodiment depicted, the propulsion system 32 includes an electric communication bus 38 for, e.g., providing electrical power from the power source 36 to the plurality of VTE fans.

More specifically, for the embodiment depicted, the power source 36 includes a combustion engine 40, an electric machine 42, and an electric energy storage unit 44. The combustion engine 40 is coupled to the electric machine 42. Accordingly, in at least certain embodiments, the combustion engine 40 may drive the electric machine 42 such that the electric machine 42 generates electrical power. In such a manner, the electric machine 42 may be configured as an electric generator and the propulsion system 32 may be referred to as a hybrid electric propulsion system. Further, with such an exemplary embodiment the electric machine 42 may provide the electrical power to, e.g., the plurality of VTE fans, to the electric energy storage unit 44, or both. In such a manner, the plurality of VTE fans may be driven by the power source 36, and more particularly, may be driven at least in part by the electric machine 42.

Figure 4:
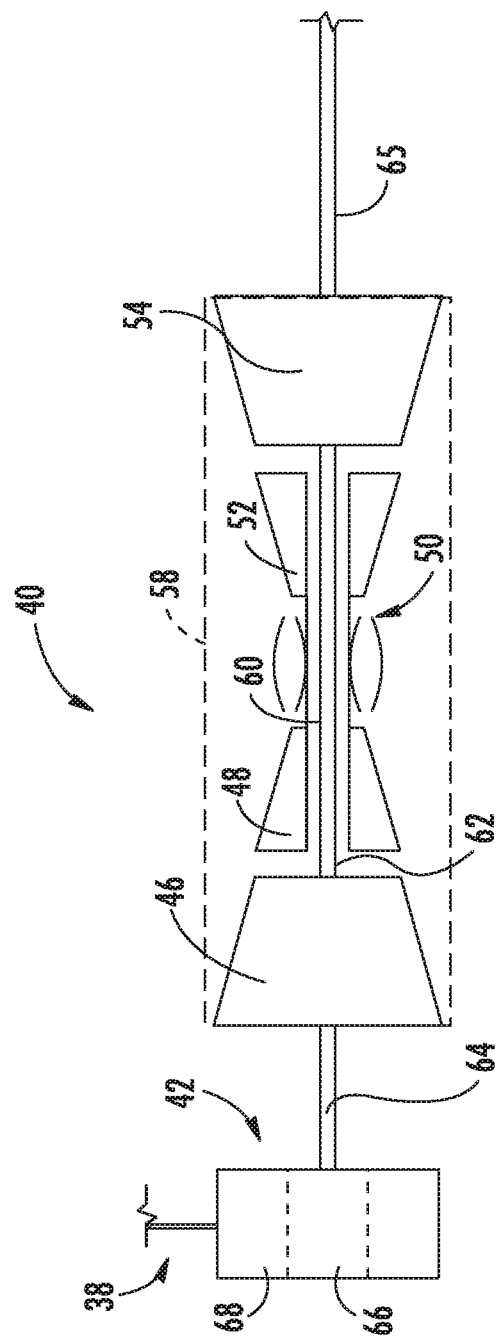
FIG. 4 is a schematic view of a power source of the exemplary aircraft of FIG. 1.

Referring now briefly to FIG. 4, a schematic view is provided of the exemplary combustion engine 40 of the power source 36 of the propulsion system 32 described above with reference to FIGS. 1 through 3. For the embodiment depicted, the combustion engine 40 is a turboshaft engine. The turboshaft engine includes in serial flow order, a compressor section including a low pressure compressor 46 and a high pressure compressor 48, a combustion section 50, and a turbine section including a high pressure turbine 52 and a low pressure turbine 54. During operation, a flow of air is received within the compressor section and is progressively compressed as it flows therethrough, i.e., as it flows from the low pressure compressor 46 to the high pressure compressor 48. The compressed air is then provided to the combustion section 50 where it is mixed with fuel and burned to generate hot combustion gas. The aircraft 10 further includes a fuel tank 56 for providing the fuel to the combustion section 50 (see FIGS. 2 and 3).

The hot combustion gas is expanded through the turbine section where rotational energy is extracted therefrom. Specifically, the hot combustion gas rotates the high pressure turbine 52 and the low pressure turbine 54 as the gas flows therethrough and is expanded. As is depicted in phantom, these components may be enclosed within a casing 58 within, e.g., the fuselage 18 of the aircraft 10. Although not depicted, the hot combustion gas may be exhausted, e.g., to atmosphere, from the low pressure turbine 54.

Also for the embodiment depicted, the high pressure turbine 52 is connected to the high pressure compressor 48 through a high pressure shaft or spool 60, such that a rotation of the high pressure turbine 52 additionally rotates the high pressure compressor 48. Similarly, the low pressure turbine 54 is connected to the low pressure compressor 46 through a low pressure shaft or spool 62, such that rotation of the low pressure turbine 54 additionally rotates the low pressure compressor 46. It should be appreciated, however, that in other exemplary embodiments, the turbomachine may have any other suitable configuration. For example, in other exemplary embodiments, the turbomachine may have any other suitable number of compressors, turbines, and/or shafts/spools. Further, although for the embodiment depicted, the combustion engine 40 is configured as a turboshaft engine, in other embodiments, the combustion engine 40 may have any other suitable configuration, such as any suitable reciprocating or internal combustion engine.

Moreover, for the embodiment depicted, the low pressure shaft 62 additionally drives an output shaft oh the turboshaft engine, and more specifically drives a first output shaft, or a forward output shaft 64, and also drives a second output shaft, or an aft output shaft 65. The forward output shaft 64 extends to the electric machine 42, and the aft output shaft 65 extends to the forward thrust propulsor 34. Accordingly, a rotation of the turboshaft engine provides, at least during certain operations, rotational energy to the electric machine 42, and the electric machine 42 is configured to convert the rotational energy to generate electrical power. More specifically, it will be appreciated that in at least certain embodiments, the electric machine 42 generally includes a rotor 66 and a stator 68. The rotational energy of the turboshaft engine is provided via the forward output shaft 64 and configured to rotate the rotor 66 of the electric machine 42 relative to the stator 68. Such relative movement may generate electrical power.

It will be appreciated that in certain exemplary embodiments, the electric machine 42, when operate as an electric generator, may be a relatively powerful electric generator. For example, in certain embodiments, the exemplary electric machine 42 may be configured to generate at least about one megawatt of electrical power during operation. For example, in certain embodiments, the electric machine 42 may be configured to generate at least about 1.5 megawatts, such as at least about two megawatts, such as up to about ten megawatts of electrical power during operation. However, in other embodiments, any other suitable sized electric machine may be provided.

Inclusion of a turboshaft engine and electric machine 42 in accordance with such an exemplary embodiment may allow for the power source 36 to generate a relatively high amount of electric power and to provide such electric power to the plurality of VTE fans of the propulsion system 32 during at least certain operations.

Referring back to FIGS. 2 and 3, as stated the power source 36 of the propulsion system 32 further includes the electric energy storage unit 44. The electric energy storage unit 44 may be a battery or other suitable component for storing electrical power. The electric energy storage unit 44 may receive electrical power from, e.g., the generator, and store electrical power for use during operation of the aircraft 10. For example, the electric energy storage unit 44 may receive and store electrical power from the electric machine 42 (operating as an electric generator) during certain operations, and subsequently provide electrical power to the plurality of VTE fans during other operations. Additionally, in still other operations, the electric energy storage unit 44 may provide electrical power back to the electric machine 42 to, e.g., power the aft fan for short durations, power the combustion engine 40 during emergency operations, or add power to the forward thrust propulsor 34 and/or to the combustion engine 40 during high power demand operations. Accordingly, with such exemplary embodiment, the electric machine 42 may further be configured as an electric motor.

Referring to a first of the plurality of wings of the aircraft 10, and more particularly to the aft starboard wing 24 depicted in FIG. 2, the propulsion system 32 includes a first plurality of VTE fans 70 integrated into the aft starboard wing 24 and oriented to generate thrust along the vertical direction V. In such a manner, each of the first plurality of VTE fans 70 are vertical lift fans, and as will be discussed in more detail below, are fixed in position such that they are only capable of generating thrust substantially along the vertical direction V of the aircraft 10. As will be discussed in greater detail below, each of the first plurality of VTE fans 70 is electrically coupled to the power source 36 to receive electrical power from, e.g., the electric machine 42 or the electric energy storage unit 44.

It will be appreciated, that as used herein, the term "along the vertical direction V of the aircraft 10" refers to a vertical direction defined by a normal orientation of the aircraft 10. For example, if the aircraft 10 is, e.g., tilted forward during certain operations, the first plurality of VTE fans 70 may provide thrust in a direction that is still along the vertical direction of the aircraft 10, but tilted relative to absolute vertical direction. Additionally, in this context, the term "substantially" refers to being within about thirty degrees of the vertical direction V of the aircraft 10.

Additionally, the first plurality of VTE fans 70 are arranged along a length of the aft starboard wing 24 generally along the transverse direction T. Additionally, the first plurality of VTE fans 70 includes an outermost VTE fan 72 along the transverse direction T relative to the fuselage 18 of the aircraft 10 and at least one interior VTE fan 74. More particularly, for the embodiment of FIG. 2, the first plurality of VTE fans 70 includes three interior VTE fans 74. However, in other embodiments, the first plurality of VTE fans 70 may have any other suitable number of interior fans 74, as will be discussed in more detail below. It will be appreciated that the outermost VTE fan 72 is at least one of a variable pitch fan or a variable speed fan to provide increased stability to the aircraft 10.

Figure 5:
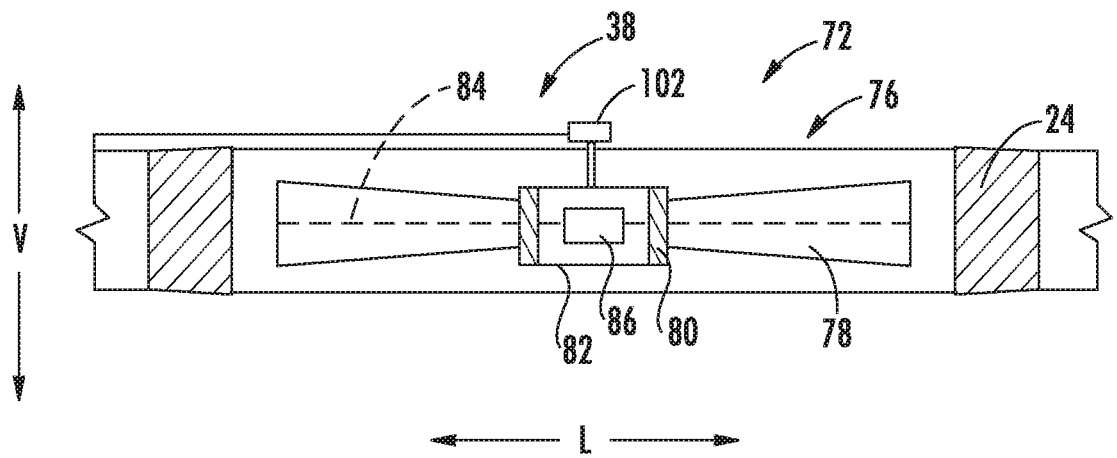
FIG. 5 is a side, schematic view of an outermost vertical thrust electric fan in accordance with an exemplary embodiment of the present disclosure in a first position.
Figure 6:
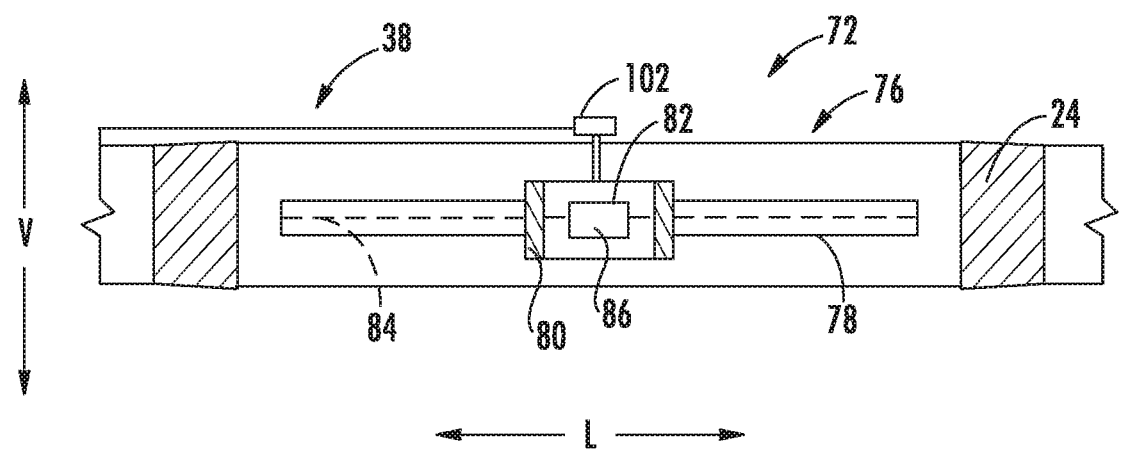
FIG. 6 is a side, schematic view of the exemplary outermost vertical thrust electric fan of FIG. 5 in a second position.

More specifically, referring now also to FIGS. 5 and 6, it will be appreciated that for the embodiment depicted, the outermost VTE fan 72 of the first plurality of VTE fans 70 is a variable pitch fan. More particularly, FIGS. 5 and 6 each provide a side, cross-sectional view of the outermost VTE fan 72 of the first plurality of VTE fans 70. As is depicted, the outermost VTE fan 72 generally includes a fan 76 having a plurality of fan blades 78 coupled to a disk 80 and an electric motor 82. The electric motor 82 is electrically coupled to the electric communication bus 38, such that the electric communication bus 38 may provide electrical power to the electric motor 82 during at least certain operations of the aircraft 10. Each of the plurality of fan blades 78 of the fan 76 may be rotatably coupled to the disk 80 about a respective pitch axis 84. The plurality of fan blades 78 are rotatable by a pitch change mechanism 86, which may change a pitch of each of the plurality of fan blades 78 of the outermost VTE fan 72 of the first plurality of VTE fans 70, e.g., in unison.

As will be appreciated, by changing the pitch of the plurality of fan blades 78 of the outermost VTE fan 72, an amount of vertical thrust generated by the outermost VTE fan 72 may be modified without requiring a change to the rotational speed. For example, FIG. 5 depicts the outermost VTE fan 72 with each of the plurality of fan blades 78 defining a relatively high pitch, such that a relatively high amount of thrust is generated by the outermost VTE fan 72 during operation of the outermost VTE fan 72. By contrast, FIG. 6 depicts the outermost VTE fan 72 with each of the plurality of fan blades 78 defining a relatively low pitch, such that a relatively low amount of thrust is generated by the outermost VTE fan 72 during operation of the outermost VTE fan 72.

Referring back to FIG. 2, it will be appreciated that the propulsion system 32 includes a similar plurality of electric fans integrated into the other wings 26, 28, 30 of the aircraft 10. Each of these electric fans are also oriented to generate thrust substantially along the vertical direction V of the aircraft 10, and in such a manner may therefore also be configured as VTE fans. More specifically, the propulsion system 32 further includes a second plurality of VTE fans 88 integrated into the aft port wing 26 and arranged along a length of the aft port wing 26, a third plurality of VTE fans 90 integrated into the forward starboard wing 28 and arranged along a length of the forward starboard wing 28, and a fourth plurality of VTE fans 92 integrated into the forward port wing 30 and arranged along a length of the forward port wing 30.

As with the first plurality of VTE fans 70, the second plurality of VTE fans 88 includes an outermost VTE fan 94 along the transverse direction T. Additionally, the third plurality of VTE fans 90 also includes an outermost VTE fan 96 along the transverse direction T and the fourth plurality of VTE fans 92 includes an outermost VTE fan 98 along the transverse direction T. The outermost VTE fans 94, 96, 98 of the second plurality of VTE fans 88, of the third plurality of VTE fans 90, and of the fourth plurality of VTE fans 92, respectively, are each also configured as one of a variable pitch fan or a variable speed fan. More particularly, for the embodiment of FIG. 2, each of such outermost VTE fans 94, 96, 98 are configured as variable pitch fans. Accordingly, each of such outermost VTE fans 94, 96, 98 may be configured in substantially the same manner as the outermost VTE fan 72 of the first plurality of VTE fans 70 (see, e.g., FIGS. 5 and 6).

Moreover, as is depicted in FIG. 2, the electric communication bus 38 electrically connects the power source 36, e.g., the electric machine 42 and/or the electric energy storage unit 44, to each of the pluralities of VTE fans 70, 88, 90, 92. Notably, for the embodiment depicted, the electric communication bus 38 includes a main controller 100 and a plurality of electric power controllers 102. The main controller 100 is electrically connected to both the electric machine 42 and the electric energy storage unit 44 and is configured to, e.g., direct electrical power from one or both of the electric machine 42 and electric energy storage unit 44 to each of the VTE fans. For example, in certain operations, the main controller 100 may direct electrical power solely from the electric machine 42 to each of the pluralities of VTE fans 70, 88, 90, 92, may direct electrical power solely from the electric energy storage unit 44 to each of the pluralities of VTE fans 70, 88, 90, 92, may direct electrical power solely from the electric machine 42 to the electric energy storage unit 44 (e.g., during forward flight), or may direct electrical power from the electric energy storage unit 44 to the electric machine 42 (e.g., during emergency operations or high-power operations) and/or to one or more of the pluralities of VTE fans 70, 88, 90, 92. Other operations are contemplated as well.

Moreover, for the exemplary embodiment of FIG. 2 the electric communication bus 38 includes an electric power controller 102 for each VTE fan (i.e., each VTE fan of the first plurality of VTE fans 70, of the second plurality of VTE fans 88, of the third plurality of VTE fans 90, and of the fourth plurality of VTE fans 92). Additionally, each of the plurality of electric power controllers 102 is associated with one VTE fan of the pluralities of VTE fans 70, 88, 90, 92. More specifically, still, the power source 36 is electrically coupled to each VTE fan of the pluralities of VTE fans 70, 88, 90, 92 through such electric power controller 102 associated with the individual VTE fan. In such a manner, the electric power controller 102 may modify the electric power provided from the power source 36 to the respective VTE fan. Accordingly, for the embodiment shown, the propulsion system 32 includes twelve electric power controllers 102, one for each of the twelve VTE fans included within the propulsion system 32.

In certain exemplary embodiments, each of the electric power controllers 102 may be one or more of a power converter, a power inverter, or a power transformer. Accordingly, in certain exemplary embodiments, the electric power controllers 102 may be configured to convert electrical power received through the electric communication bus 38 from alternating current ("AC") electrical power to direct current ("DC") electrical power, or vice versa, and further may be configured in at least certain embodiments to modify an amount of the electrical power (e.g., a voltage or a current) received through the electric communication bus 38 from the power source 36 before transferring such electrical power to a respective VTE fan.

Accordingly, in at least certain embodiments each of the electric power controllers 102 may modify an amount of electrical power provided to a respective VTE fan, which as will be appreciated, may allow for the aircraft 10, and more specifically may allow for the main controller 100, to modify a rotational speed of each VTE fan of the pluralities of VTE fans 70, 88, 90, 92. For example, each of the electric power controllers 102 may be operably coupled to the main controller 100 through, e.g., a wired or wireless communication bus (not shown), such that the main controller 100 may control the electrical power provided to each of the individual VTE fans. The main controller 100 may be integrated into, or otherwise operably connected to, the control system of the aircraft 10.

Accordingly, it will be appreciated that in at least certain embodiments each VTE fan of the pluralities of VTE fans 70, 88, 90, 92 may be a variable speed fan. Accordingly, by modifying an amount of electrical power provided to each VTE fan through a respective electric power controller 102, the aircraft 10 may modify a rotational speed of each of the respective VTE fans, and therefore an amount of vertical thrust provided by each of the respective VTE fan. In such a manner, the aircraft 10 may allow for more dynamic control during vertical takeoff and landing, or other vertical thrust operations.

It should be appreciated, however, that in other exemplary embodiments, the aircraft 10, or rather, the electric communication bus 38 may not include an electric power controller 102 for each of the individual VTE fans. Instead, for example, in other embodiments, the electric communication bus 38 may include a single electric power controller 102 for each of the individual pluralities of VTE fans 70, 88, 90, 92. In still other embodiments, however, any other suitable configuration may be provided.

With reference back to the first plurality of VTE fans 70, and as will be discussed with reference to FIGS. 7 and 8, below, providing a cross-sectional view of an interior VTE fan 74 of the first plurality of VTE fans 70, for the embodiment of FIG. 2, at least one of the interior VTE fans 74 is configured differently than the outermost VTE fan 72. More specifically, for the embodiment depicted, the interior VTE fans 74 of the first plurality of VTE fans 70 are each configured as fixed pitch fans, while the outermost VTE fan 72 is configured as a variable pitch fan (discussed above). Such a configuration may allow at least some of the first plurality of VTE fans 70 to have a more simple configuration, while the first plurality of VTE fans 70 may still provide a desired amount of stability for the aircraft 10 due to the inclusion of a variable pitch outermost VTE fan 72.

Similarly, the second plurality of VTE fans 88 includes at least one interior VTE fan 104, the third plurality of VTE fans 90 includes these one interior VTE fan 106, and the fourth plurality of VTE fans 92 includes at least one interior VTE fan 108. More specifically, the second plurality of VTE fans 88 includes three interior VTE fans 104, the third plurality of VTE fans 90 includes one interior VTE fan 106, and the fourth plurality of VTE fans 92 includes one interior VTE fan 108. For the embodiment depicted, each of the at least one interior VTE fans 104, 106, 108 of the respective pluralities of VTE fans 88, 90, 92 is configured differently than the outermost VTE fan 94, 96, 98 of the respective pluralities of VTE fans 88, 90, 92.

It will be appreciated, however, that in other exemplary embodiments, each of the respective pluralities of VTE fans 70, 88, 90, 92 may have any other suitable number of interior VTE fans 74, 104, 106, 108, and further that the at least one interior VTE fan 74, 104, 106, 108 of each of the pluralities of VTE fans 70, 88, 90, 92 may be configured in the same manner as the outermost VTE fan 72, 94, 96, 98 of the respective plurality of VTE fans 70, 88, 90, 92. For example, in other exemplary embodiments, each of the first plurality of VTE fans 70, second plurality of VTE fans 88, third plurality of VTE fans 90, and fourth plurality of VTE fans 92 may be configured as variable speed, fixed pitch fans, or alternatively, may each be configured as variable speed, variable pitch fans.

Moreover, as briefly stated above, and as is shown in FIGS. 2 and 3, each of the wings 24, 26, 28, 30 are fixed wings including a variable control portion that is generally movable between a vertical thrust position (FIG. 2) and a forward thrust position (FIG. 3). More specifically, referring now also to FIGS. 7 and 8, providing a side, cross-sectional view of the aft starboard wing 24 and an interior VTE fan 74 of the first plurality of VTE fans 70, the aft starboard wing 24 (as well as the other wings 24, 26, 28, 30, discussed in more detail below) generally includes a variable geometry portion 110. The variable geometry portion 110 is movable between a forward thrust position (FIG. 7), one or more transitional positions (not shown), and a vertical thrust position (FIG. 8), and further is generally formed of a surface portion of the respective wings 24, 26, 28, 30. As will be appreciated, however, a main body or frame portion of the wings 24, 26, 28, 30 remain stationary during this movement.

When the variable geometry portion 110 is moved from the forward thrust position to the vertical thrust position, the first plurality of VTE fans 70 are exposed. By contrast, when the variable geometry portion 110 is moved from the vertical thrust position to the forward thrust position, the first plurality of VTE fans 70 are substantially completely covered. For the embodiment depicted, the variable geometry portion 110 forms an exhaust arrangement for the first plurality of VTE fans 70 when moved to the vertical thrust position. As used herein, the term "exhaust arrangement" refer generally to any structure located downstream of the respective fan configured to channel at least a portion of an airflow from the respective fan to increase a power loading (i.e., a ratio of thrust produced to an amount of power received) of such fan. For example, the exhaust arrangement may be configured generally as a nozzle or diffuser for the respective fans.

More specifically, for the embodiment depicted, the aft starboard wing 24, or rather, the variable geometry portion 110 of the aft starboard wing 24, generally includes a forward section 112 and an aft section 114. Referring back briefly to FIGS. 2 and 3, it will be appreciated that for the embodiment shown, the forward section 112 and the aft section 114 of the variable geometry portion 110 each extends from the innermost VTE fan of the first plurality of VTE fans 70 to the outermost VTE fan 72 of the first plurality of VTE fans 70. In such a manner, when the variable geometry portion 110 is moved to the vertical thrust position, the exhaust arrangement formed by the variable geometry portion 110 also extends from the innermost VTE fan of the first plurality of VTE fans 70 to the outermost VTE fan 72 of the first plurality of VTE fans 70.

Figure 7:
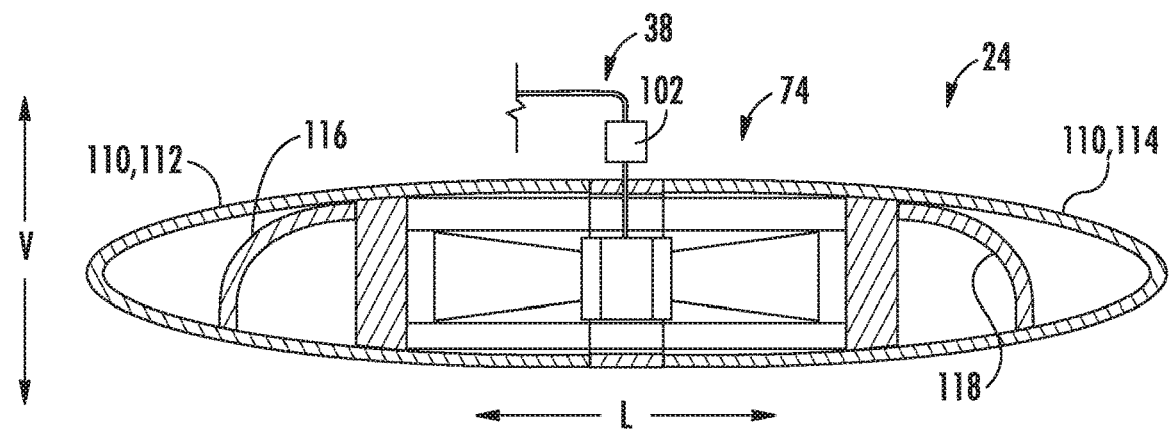
FIG. 7 is a side, schematic view of a wing of the exemplary aircraft of FIG. 1 in accordance with an exemplary embodiment of the present disclosure in a forward flight position.
Figure 8:
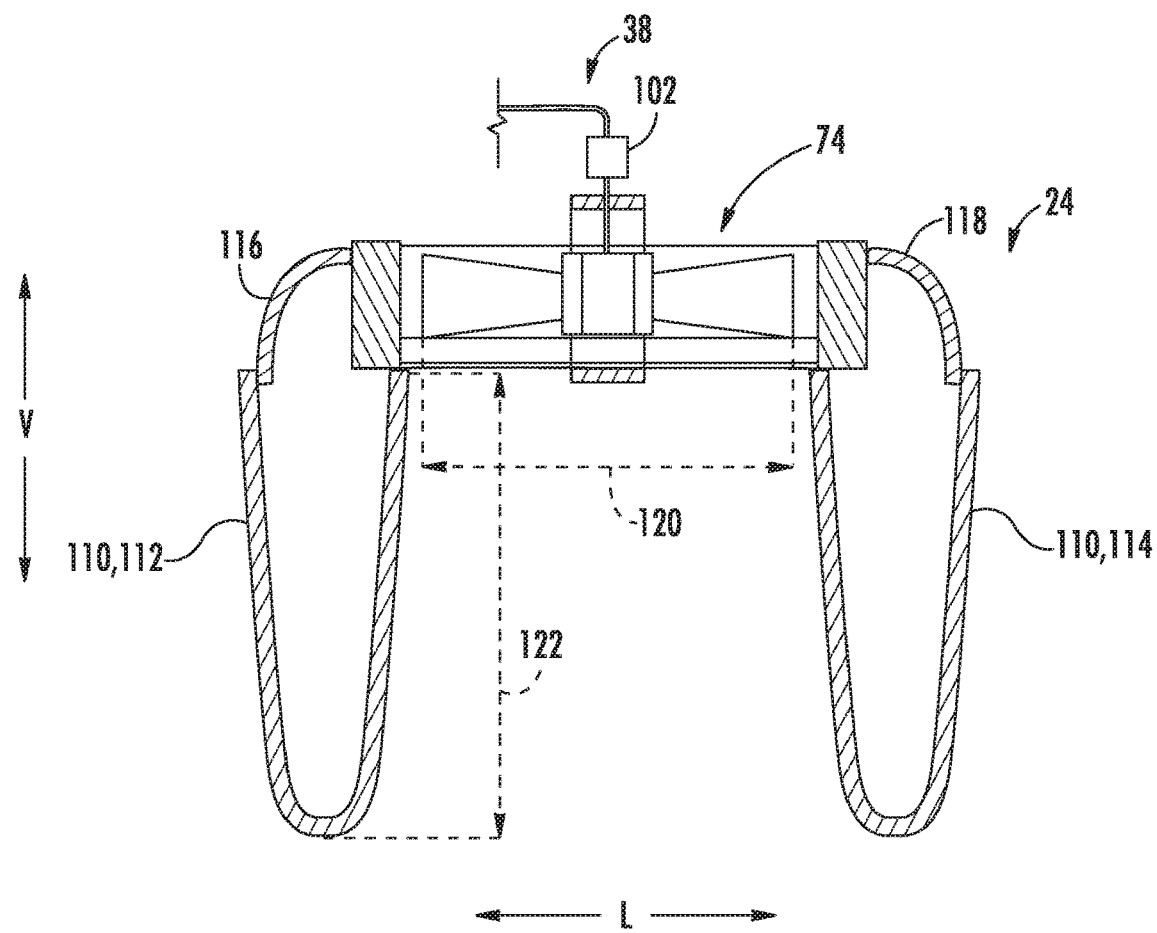
FIG. 8 is a side, schematic view of the exemplary wing of FIG. 7 in a vertical flight position.

Referring particularly to FIG. 7, when the variable geometry portion 110 of the aft starboard wing 24 is in the forward thrust position, the forward section 112 and the aft section 114 together define at least in part an airfoil cross-sectional shape. Such may allow for relatively efficient forward flight for the aircraft 10. By contrast, however, as is depicted in FIG. 8, when the variable geometry portion 110 of the aft starboard wing 24 is moved to the vertical thrust position, the forward section 112 and the aft section 114 of the variable geometry portion 110 together form the exhaust arrangement. For example, in certain exemplary embodiments, the forward section 112 may be mounted on a forward track 116 within the aft starboard wing 24 such that when it is moved from the forward thrust position to the vertical thrust position it translates forward along the transverse direction T and pivots downward along the vertical direction V to the position shown in FIG. 8. Similarly, the aft section 114 may be mounted on an aft track 118 within the aft starboard wing 24 such that when it is moved from the forward thrust position to the vertical thrust position it translates aft along the transverse direction T and pivots downward along the vertical direction V to the position shown in FIG. 8.

It will be appreciated that each of the first plurality of VTE fans 70 define a fan diameter 120, and for the embodiment depicted (see FIG. 2), the fan diameter 120 of each of the first plurality of VTE fans 70 is substantially the same. Further, the exhaust arrangement formed by the variable geometry portion 110 of the aft starboard wing 24 defines a length 122 along the vertical direction V. For the embodiment depicted, the length 122 is equal to, or greater than the fan diameter 120 of each VTE fan of the first plurality of VTE fans 70. More specifically, for the embodiment depicted, the length 122 is at least about ten percent greater the fan diameter 120 of each VTE fan of the first plurality of VTE fans 70. For example, in at least certain embodiments, the length 122 may be at least about fifteen percent greater, such as at least about twenty-five percent greater, such as at least about fifty percent greater than the fan diameter 120 of each VTE fan of the first plurality of VTE fans 70, and may be less than or equal to ten times the fan diameter 120 of each VTE fan.

It will additionally be appreciated that each of the remaining wings 26, 28, 30 similarly include a variable geometry portion 110 movable between a forward thrust position and a vertical thrust position, wherein such variable geometry portion 110 forms an exhaust arrangement when in the vertical thrust position. It will be appreciated, however, that in other exemplary embodiments, the variable geometry portion 110 of each wing 24, 26, 28, 30 may have any other suitable configuration for forming an exhaust arrangement for each respective plurality of VTE fans 70, 88, 90, 92.

It will further be appreciated that inclusion of wings having a variable geometry portion for forming an exhaust arrangement for each of the plurality of VTE fans may allow for much higher efficiency VTE fans. In such a manner, each of the plurality of VTE fans may be smaller than would otherwise be required to generate a necessary amount of vertical thrust for the aircraft to perform vertical takeoffs, vertical landings, and general hover maneuvers.

Further, with the inclusion of the distributed VTE fans along a length of the respective wings 24, 26, 28, 30 in the manner described herein, combined with the increased efficiency allowed by the exhaust arrangements formed by the respective wings 24, 26, 28, 30, each of the wings 24, 26, 28, 30 may define an aspect ratio providing for relatively efficient forward flight. More specifically, for the embodiment depicted, the aft starboard wing 24 may define an aspect ratio between about 3:1 and about 5.5:1. More specifically, for the embodiment depicted, the aft starboard wing 24 may define an aspect ratio between about 4:1 and about 5:1. Further, the aft port wing 26 may define aspect ratio that is substantially equal to the aspect ratio of the aft starboard wing 24. Further, the forward starboard wing 28 and the forward port wing 30 may each define an aspect ratio between about 1.5:1 and about 5:1, such as between about 2:1 and about 3:1.

It will be appreciated, that as used herein, the term "aspect ratio" generally refers to a ratio of the wing's span to its mean chord.

Inclusion of wings configured in such a manner may allow for an overall more efficient aircraft 10.

Figure 9:
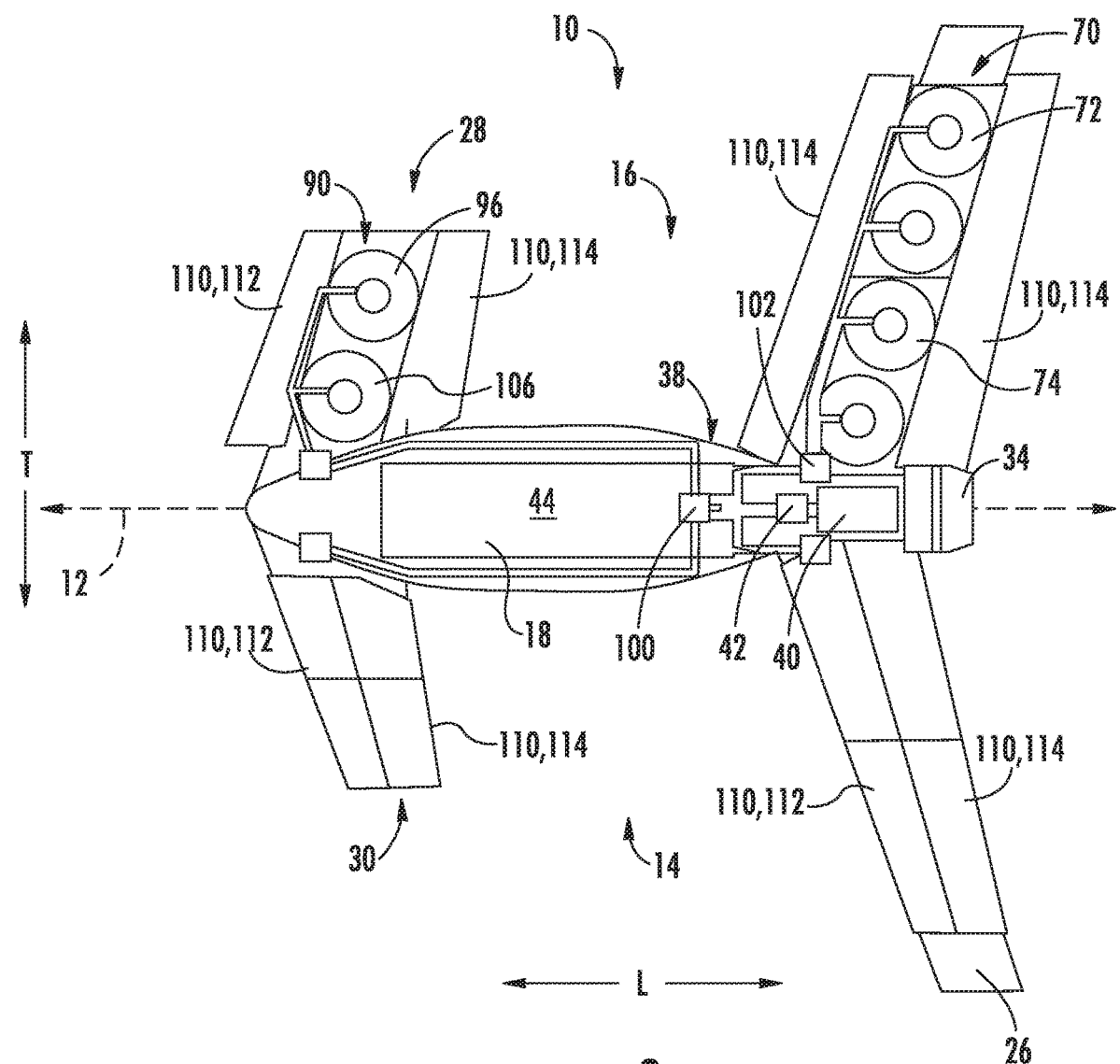
FIG. 9 is a top, schematic view of an aircraft according to another exemplary embodiment of the present disclosure.

It will be appreciated, however, that in other exemplary embodiments, the aircraft 10 may have any other suitable configuration. For example, in other exemplary embodiments, the aircraft 10 may have any other configuration (including position and/or number) of wings, any other forward thrust propulsor 34, etc. Further, in still other exemplary embodiments, the power source 36 may have any other suitable configuration for providing electrical power to the pluralities of VTE fans 70, 88, 90, 92. For example, referring now briefly to FIG. 9, providing a top, schematic view of an aircraft 10 in accordance with another exemplary embodiment of the present disclosure, will be appreciated that in other embodiments, the power source 36 may not include the combustion engine 40. For example, in other exemplary embodiments, such as the embodiment of FIG. 9, it will be appreciated that the propulsion system may be a purely electric propulsion system, and the power source 36 may be an electric energy storage unit 44 (e.g., a battery). Such may allow for quieter and more fuel-efficient operations of the aircraft 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft defining a vertical direction and a transverse direction, the aircraft comprising:
   a fuselage;
   a wing coupled to, and extending from, the fuselage, the wing including a variable geometry portion forming an exhaust arrangement when moved to a vertical thrust position, the exhaust arrangement defining an arrangement length along the vertical direction; and
   a propulsion system comprising a plurality of electric fans integrated into the wing and oriented to generate thrust along the vertical direction, the plurality of electric fans arranged along a length of the wing and including an interior electric fan and an outermost electric fan along the transverse direction relative to the fuselage, the outermost electric fan defining a fan diameter and positioned on an opposing side of the interior electric fan from the fuselage, wherein the length is greater than or equal to the fan diameter, and wherein the outermost electric fan is configured as at least one of a variable pitch fan or a variable speed fan to provide increased stability to the aircraft.

2. The aircraft of claim 1, wherein the interior electric fan is configured differently than the outermost electric fan.

3. The aircraft of claim 2, wherein the outermost electric fan is a variable pitch fan, and wherein the interior electric fan is a fixed-pitch fan.

4. The aircraft of claim 1, wherein the interior electric fan is configured in the same manner as the outermost electric fan.

5. The aircraft of claim 1, wherein the wing is a first wing, wherein the plurality of electric fans of the propulsion system is a first plurality of electric fans, and wherein the aircraft further comprises:
   a second wing, a third wing, and a fourth wing, wherein the propulsion system further comprises a second plurality of electric fans integrated into the second wing and arranged along a length of the second wing, a third plurality of electric fans integrated into the third wing and arranged along a length of the third wing, and a fourth plurality of electric fans integrated into the fourth wing and arranged along a length of the fourth wing, wherein each of the second plurality of electric fans, the third plurality of electric fans, and fourth plurality of electric fans are oriented to generate thrust along the vertical direction.

6. The aircraft of claim 5, wherein the second plurality of electric fans includes an outermost electric fan along the transverse direction relative to the fuselage being at least one of a variable pitch fan or a variable speed fan, wherein the third plurality of electric fans includes an outermost electric fan along the transverse direction relative to the fuselage being at least one of a variable pitch fan or a variable speed fan, and wherein the fourth plurality of electric fans includes an outermost electric fan along the transverse direction relative to the fuselage being at least one of a variable pitch fan or a variable speed fan.

7. The aircraft of claim 1, wherein the plurality of electric fans are exposed in the vertical thrust position and the plurality of electric fans are each substantially completely covered in the forward thrust position.

8. The aircraft of claim 1, wherein each of the plurality of electric fans define substantially the same fan diameter.

9. The aircraft of claim 1, wherein the propulsion system further comprises a power source comprising a combustion engine and an electric machine, the electric machine powered by the combustion engine, and wherein the plurality of electric fans are driven at least in part by the electric machine.

10. The aircraft of claim 9, wherein the propulsion system further comprises a forward thrust propulsor, wherein the forward thrust propulsor is selectively or permanently mechanically coupled to the combustion engine.

11. The aircraft of claim 1, wherein the wing defines an aspect ratio greater than about 3:1.

12. The aircraft of claim 11, wherein the wing is an aft wing, and wherein the aircraft further comprises:
    a forward wing, the forward wing attached to, and extending from, the fuselage at a location forward of the aft wing, wherein the forward wing defines an aspect ratio greater than or equal to about 1.5:1.

13. The aircraft of claim 1, wherein the propulsion system further comprises an electric power source and an electric power bus, wherein the electric power bus electrically connects the electric power source to each of the plurality of electric fans.

14. The aircraft of claim 13, wherein the electric power bus comprises a plurality of electric power controllers with each of the plurality of electric power controllers associated with one of the plurality of electric fans, wherein each electric power controller is configured to modify electrical power provided from the electric power source to the respective electric fan.

15. The aircraft of claim 14, wherein each of the plurality of electric fans are configured as variable speed fans.

16. An aircraft defining a vertical direction and a transverse direction, the aircraft comprising:
    a fuselage;
    a fixed wing coupled to the fuselage and defining a variable geometry portion forming an exhaust arrangement when moved to a vertical thrust position, the exhaust arrangement defining an arrangement length along the vertical direction; and a propulsion system comprising a plurality of electric fans integrated into the wing and oriented to generate thrust along the vertical direction, the plurality of electric fans arranged along a length of the wing and including an interior electric fan and an outermost electric fan along the transverse direction relative to the fuselage, the outermost electric fan positioned on an opposing side of the interior electric fan from the fuselage, the outermost electric fan defining a fan diameter, wherein the arrangement length is greater than or equal to the fan diameter.

17. The aircraft of claim 16, wherein each of the plurality of electric fans define substantially the same fan diameter.

18. An aircraft defining a vertical direction and a transverse direction, the aircraft comprising:

a fuselage;

a wing coupled to, and extending from, the fuselage, the wing including a variable geometry portion movable between a vertical thrust position and a forward thrust position; and a propulsion system comprising a plurality of electric fans integrated into the wing and oriented to generate thrust along the vertical direction, the plurality of electric fans arranged along a length of the wing and including an interior electric fan and an outermost electric fan along the transverse direction relative to the fuselage, the outermost electric fan positioned on an opposing side of the interior electric fan from the fuselage and being at least one of a variable pitch fan or a variable speed fan to provide increased stability to the aircraft, wherein the variable geometry portion includes at least one of a forward section or an aft section that is positioned outwardly of the outermost electric fan while at least partially covering the outermost electric fan when the variable geometry portion is in the forward thrust position.

\* \* \* \* \*